US012584604B2

(12) United States Patent
Kim

(10) Patent No.: US 12,584,604 B2
(45) Date of Patent: Mar. 24, 2026

(54) DIGITAL MICRO-MIRROR DEVICE (DMD) SYSTEM

(71) Applicant: HYUNDAI MOBIS CO., LTD., Seoul (KR)

(72) Inventor: Myeong Je Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 494 days.

(21) Appl. No.: 18/068,369

(22) Filed: Dec. 19, 2022

(65) Prior Publication Data

US 2023/0265985 A1      Aug. 24, 2023

(30) Foreign Application Priority Data

Feb. 18, 2022     (KR) ........................ 10-2022-0021176

(51) Int. Cl.
| | |
|---|---|
| *F21S 41/675* | (2018.01) |
| *F21S 41/141* | (2018.01) |
| *F21W 107/10* | (2018.01) |
| *F21Y 115/10* | (2016.01) |
| *G02B 26/08* | (2006.01) |
| *H05B 45/325* | (2020.01) |
| *H05B 45/56* | (2020.01) |

(52) U.S. Cl.
CPC .......... *F21S 41/675* (2018.01); *F21S 41/141* (2018.01); *G02B 26/0833* (2013.01); *H05B 45/325* (2020.01); *H05B 45/56* (2020.01); *F21W 2107/10* (2018.01); *F21Y 2115/10* (2016.08)

(58) Field of Classification Search
CPC ...... F21S 41/675; F21S 41/141; H05B 45/56; H05B 45/325; G02B 26/0833; F21Y 2115/10; F21W 2107/10
See application file for complete search history.

(56) References Cited

U.S. PATENT DOCUMENTS

| | | | |
|---|---|---|---|
| 10,292,227 B1 * | 5/2019 | Moumen ................ | H05B 45/14 |
| 2007/0063961 A1 * | 3/2007 | Kuroki ................. | G09G 3/3413 |
| | | | 345/102 |
| 2012/0161633 A1 * | 6/2012 | Nishitani ............. | B60Q 11/005 |
| | | | 315/117 |
| 2022/0113614 A1 * | 4/2022 | Chen .................... | G03B 21/142 |

(Continued)

FOREIGN PATENT DOCUMENTS

| | | | | |
|---|---|---|---|---|
| KR | 2021-0128132 | | 10/2021 | |
| WO | WO-2021187462 A1 * | 9/2021 | ......... | G02B 26/0833 |

OTHER PUBLICATIONS

English Translation of PCT/JP2021/010540 of WO 2021/187462 A1 (Year: 2021).*

(Continued)

*Primary Examiner* — Kyu Chae

(74) *Attorney, Agent, or Firm* — DLA PIPER LLP US

(57) ABSTRACT

A digital micro-mirror device (DMD) system capable of increasing a lifespan of a digital micro-mirror. The DMD system includes an array unit that includes a plurality of digital micro-mirrors, and a DMD controller that controls the digital micro-mirror according to an image signal input from the outside, and changes a duty ratio of the digital micro-mirror according to a condition of components included in a vehicle or an environment around the vehicle.

9 Claims, 7 Drawing Sheets

(56)       References Cited

U.S. PATENT DOCUMENTS

| 2023/0096367 | A1* | 3/2023 | Mano ................... | B60Q 11/005 |
| | | | | 362/543 |
| 2023/0127995 | A1* | 4/2023 | Tsuchida .............. | B60K 35/231 |
| | | | | 345/694 |

OTHER PUBLICATIONS

English Language Abstract of KR 2021-0128132 published Oct. 26, 2021.

* cited by examiner

MEASURED VOLTAGE WITH RESPECT TO BRIGHTNESS

WHEN USING PULL—UP RESISTOR

DIGITAL MICRO-MIRROR DEVICE (DMD) SYSTEM

CROSS-REFERENCE TO RELATED APPLICATIONS

This application claims priority under 35 U.S.C. § 119 to Korean Patent Application No. 10-2022-0021176, filed on Feb. 18, 2022, in the Korean Intellectual Property Office, the disclosure of which is incorporated herein by reference in its entirety.

TECHNICAL FIELD

The following disclosure relates to a digital micro-mirror device (DMD) system, and more particularly, to a DMD system capable of increasing the lifespan of a digital mirror.

BACKGROUND

A digital micro-mirror device (DMD) is composed of an array of digital micro-mirrors. The DMD displays predetermined patterns or images by individually controlling angles of digital micro-mirrors through a micro current. Since each of the digital micro-mirrors constituting the DMD corresponds to pixels constituting one pattern or image, a precise pattern or image can be realized by individually controlling the digital micro-mirrors included in the DMD.

FIG. 1 schematically illustrates some of digital micro-mirrors included in a digital micro-mirror array.

A digital micro-mirror array outputs a specific image by reflecting light incident from a light source such as an LED. In this case, when a first digital micro-mirror 11 is tilted to one side, the first digital micro-mirror 11 reflects light, and a second digital micro-mirror 12 tilted to an opposite side to the one side does not reflect light. That is, like the first digital micro-mirror 11, a state in which the digital micro-mirror is tilted to one side may be called ON, and like the second digital micro-mirror 12, a state in which the digital micro-mirrors is tilted to the other side may be called OFF. The digital micro-mirror has a problem in that the lifetime is reduced when a time when the digital micro-mirror is tilted to one side, that is, an ON time increases.

RELATED ART DOCUMENT

Patent Document

Korean Patent Laid-Open Publication No. 10-2021-0128132 ("Apparatus for Controlling Headlamp of Vehicle" published on Oct. 26, 2021)

SUMMARY

An embodiment of the present invention is directed to providing a digital micro-mirror device (DMD) system capable of increasing the lifespan of a digital micro-mirror.

In one general aspect, a digital micro-mirror device (DMD) system includes: an array unit that includes a plurality of digital micro-mirrors reflecting light; and a DMD controller that controls the digital micro-mirror according to a predetermined image signal, and changes a duty ratio of the digital micro-mirror according to a condition or an operation mode of components included in a vehicle or an environment around the vehicle.

The DMD controller may reduce the duty ratio of the digital micro-mirror when illuminance provided from an illuminance sensor sensing illuminance around the vehicle is lower than a predetermined reference.

The DMD system may further include: a temperature sensor that senses a temperature of the digital micro-mirror, in which the DMD controller may reduce the duty ratio of the digital micro-mirror when the temperature sensed by the temperature sensor is higher than a predetermined reference.

The DMD controller may differently control the duty ratio of the digital micro-mirror according to a driving mode of an adaptive front lighting system (AFLS) of the vehicle.

The DMD controller may control the duty ratio of the digital micro-mirror with a first duty ratio when the driving mode of the AFLS of the vehicle is a highway driving mode, when the driving mode of the AFLS of the vehicle is a national road driving mode, the duty ratio of the digital micro-mirror may be controlled with a second duty ratio, and when the driving mode of the AFLS of the vehicle is the city driving mode, the duty ratio of the digital micro-mirror may be controlled with a third duty ratio, and the first duty ratio and the third duty ratio may be greater than the second duty ratio.

The DMD system may further include: a light-emitting diode (LED) that irradiates light to the array unit; and an LED controller that drives the LED, in which, when the DMD controller reduces the duty ratio of the digital micro-mirror, the LED controller may increase a current applied to the LED to increase the LED output.

The DMD system may further include: a filter unit that receives a control signal, which is a pulse width modulation (PWM) signal, from the LED controller and converts the received control signal into an analog signal; and a converter that receives the analog signal converted by the filter unit and controls a magnitude of current flowing through the LED according to a voltage level of the received analog signal.

The DMD system may further include: a light-emitting diode (LED) that irradiates light to the array unit; an LED controller that drives the LED; and a temperature sensor that senses the temperature of the LED, in which, when the temperature of the LED sensed by the temperature sensor increases, the LED controller may reduce a current input to the LED to reduce the LED output, and the DMD controller may increase the duty ratio of the digital micro-mirror.

The DMD system may further include: a filter unit that receives a control signal, which is a pulse width modulation (PWM) signal, from the LED controller and converts the received control signal into an analog signal; and a converter that receives the analog signal converted by the filter unit and controls a magnitude of current flowing through the LED according to a voltage level of the received analog signal.

The DMD controller may receive a duty ratio command of the digital micro-mirror received from a terminal, and change the duty ratio of the digital micro-mirror according to the received duty ratio command of the digital micro-mirror.

The DMD controller may output the changed duty ratio information of the digital micro-mirror to the terminal.

DETAILED DESCRIPTION OF MAIN ELEMENTS

Figure 1:
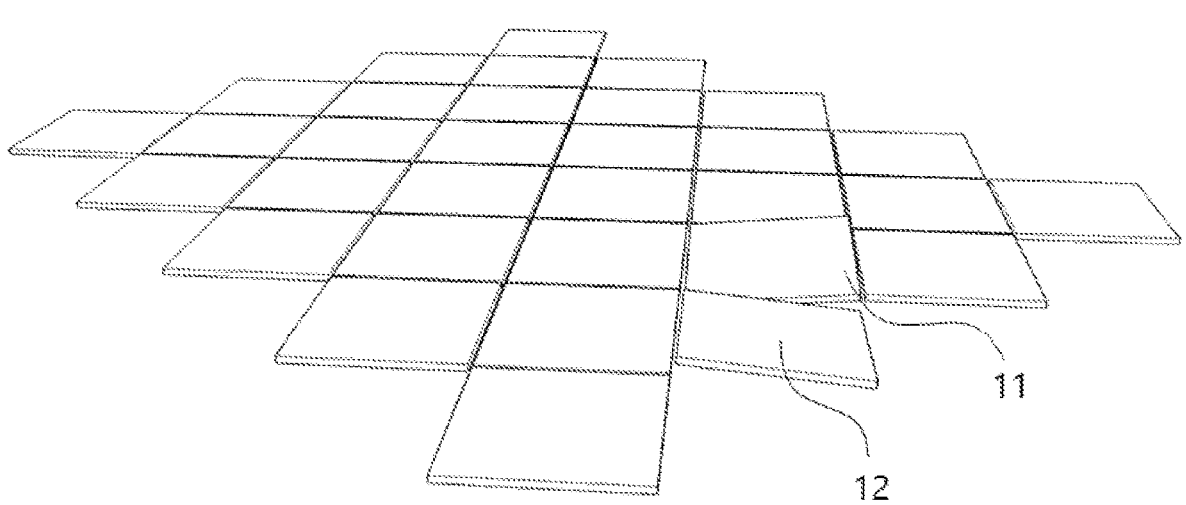
FIG. 1 is a schematic diagram of some of digital micro-mirrors included in a digital micro-mirror array.

11: First digital micro-mirror
12: Second digital micro-mirror
20: Vehicle system
21: Illuminance sensor
30: DMD system
40: AFLS
100: Array unit
200: DMD controller
300: LED
400: LED controller
500: Temperature sensor
600: Converter
700: Filter unit
800: Power board

DETAILED DESCRIPTION OF EMBODIMENTS

Hereinafter, a preferred embodiment of a digital micro-mirror device (DMD) system according to the present invention will be described in detail with reference to the accompanying drawings.

Figure 2:
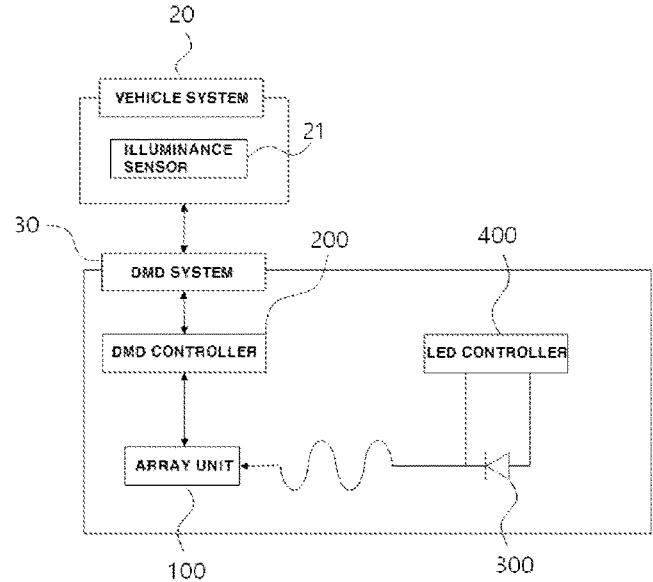
FIG. 2 is a block diagram of a digital micro-mirror device (DMD) system according to a first embodiment of the present invention.

FIG. 2 illustrates a block diagram of a DMD system according to a first embodiment of the present invention.

As illustrated in FIG. 2, the DMD system according to the first embodiment of the present invention may include an array unit 100, a DMD controller 200, an LED 300, and an LED controller 400.

The array unit 100 includes a plurality of digital micro-mirrors. The digital micro-mirrors are arranged two-dimensionally, and each digital micro-mirror operates as an individual pixel. A state in which the plurality of digital micro-mirrors included in the array unit 100 are tilted to one side is referred to as ON. A state in which the plurality of digital micro-mirrors included in the array unit 100 are tilted to the other side is referred to as OFF. A ratio of ON and OFF of the digital micro-mirror is called a duty ratio. For example, a duty ratio of 70:30 means that a time when the digital micro-mirror is ON is 70% of a unit time and a time when the digital micro-mirror is OFF is 30%. Increasing the duty ratio means increasing the ON time ratio, and decreasing the duty ratio means reducing the ON time ratio. The duty ratio of the digital micro-mirror may determine luminance of an image output from the DMD system. More specifically, when the duty ratio of the digital micro-mirror increases, the luminance of the image also increases, and when the duty ratio of the digital micro-mirror is reduced, the luminance of the image is also reduced.

The DMD controller 200 is implemented as a predetermined electronic device and controls the digital micro-mirror included in the array unit 100 according to an image signal input from the outside. Here, the outside may be a vehicle system 20. In the present invention, the DMD controller 200 changes the duty ratio of the digital micro-mirror according to the condition of components included in the vehicle in which the DMD system 30 according to the present invention is installed or the environment around the vehicle, thereby increasing the lifespan of the digital micro-mirror or to properly operating the digital micro-mirror according to the situations.

The LED 300 irradiates light to the array unit 100, and the LED controller 400 controls the LED 300. That is, the digital micro-mirror reflects the light irradiated from the LED 300 and outputs a predetermined image. The roles of the LED 300 and the LED controller 400 will be described in more detail in another embodiment of the present invention.

As illustrated in FIG. 2, an illuminance sensor 21 senses illuminance around the vehicle in which the DMD system according to the first embodiment of the present invention is installed. Here, the illuminance sensor 21 may be a component included in the vehicle system 20, and may be installed at a position where it is easy to sense the illuminance around the vehicle. The DMD controller 200 may differently control the duty ratio of the digital micro-mirror included in the array unit 100 according to the illuminance around the vehicle sensed by the illuminance sensor 21. More specifically, the DMD controller 200 may lower the duty ratio of the digital micro-mirror when a predetermined reference value of illuminance is preset and the illuminance sensed by the corresponding illuminance sensor 21 is lower than the reference value.

Figure 3A:
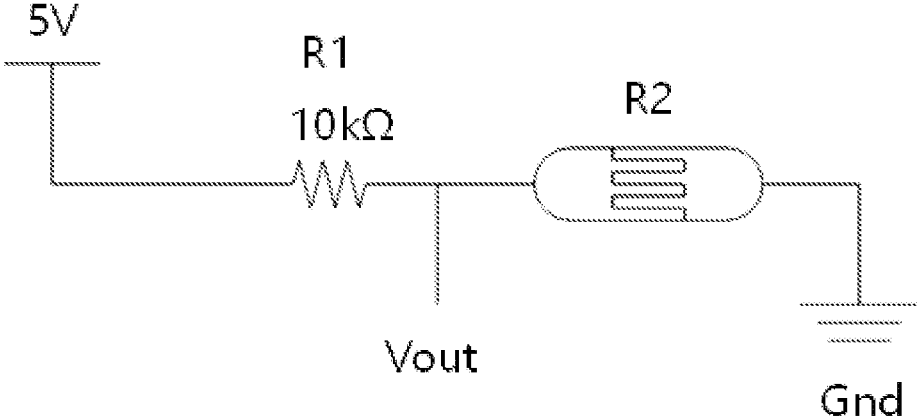
FIG. 3A is a circuit diagram of an illuminance sensor used in the DMD system according to a first embodiment of the present invention.
Figure 3B:
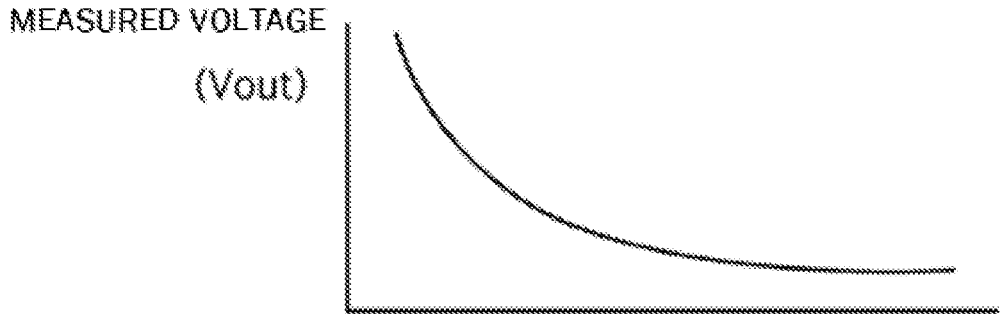
FIG. 3B is a graph of the measured voltage according to the illuminance by the illuminance sensor.

FIGS. 3A and 3B illustrate an example of the illuminance sensor 21 used in the DMD system according to the first embodiment of the present invention, and illustrate a circuit diagram and a measured voltage according to the measured illuminance.

As illustrated in FIG. 3A, in this embodiment, the illuminance sensor 21 may be implemented using a pull-up resistor. As illustrated in FIG. 3B, a voltage Vout measured by the illuminance sensor 21 implemented using the pull-up resistor decreases as the sensed brightness increases, and the voltage Vout measured by the illuminance sensor 21 increases as the sensed brightness decreases.

Figure 4:
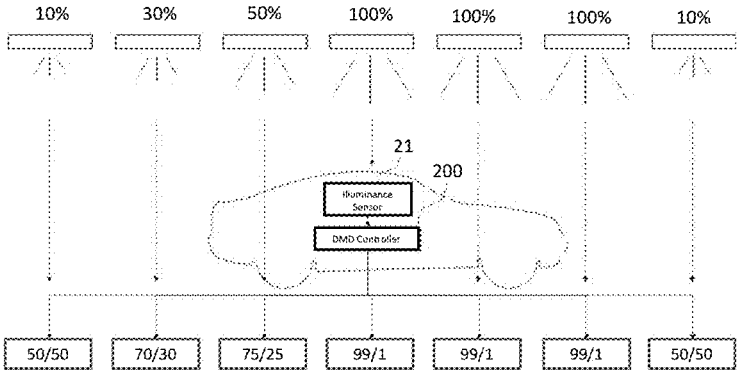
FIG. 4 is a diagram schematically illustrating an example of differently adjusting a duty ratio of the digital micro-mirror in a DMD controller 200 according to ambient brightness of a vehicle in the DMD system according to the first embodiment of the present invention.

FIG. 4 is a diagram schematically illustrating an example of differently adjusting a duty ratio of the digital micro-mirror in a DMD controller 200 according to ambient brightness of a vehicle in the DMD system according to the first embodiment of the present invention.

As illustrated in FIG. 4, when the illuminance around the vehicle in which the illuminance sensor 21 is installed is 10%, since the surrounding brightness is not bright, even if the quantity of light reflected from the digital micro-mirror is not large, it is possible to easily identify the image output from the digital micro-mirror. Here, illuminance of 10% may mean about $\frac{1}{10}$ of illuminance based on illuminance of 100%. As described above, when the illuminance around the vehicle is 10%, the DMD controller 200 controls the duty ratio of the digital micro-mirror to 50/50, thereby preventing the lifespan of the digital micro-mirror from being reduced. Here, the duty ratio of 50/50 may mean that, when the time when the digital micro-mirror is ON is 50, the time when the digital micro-mirror is OFF is 50. When the illuminance around the vehicle in which the illuminance sensor 21 is installed is 30%, the brightness (luminance) of the image output from the digital micro-mirror should be brighter to facilitate image identification. Therefore, in order to increase the brightness of the image output from the digital micro-mirror, the DMD controller 200 may increase the duty ratio of the digital micro-mirror compared to the case where the illuminance around the vehicle is 10% to control the duty ratio to 70/30. Similarly, when the illuminance around the vehicle is 50%, the DMD controller 200 may control the duty ratio of the digital micro-mirror to 75/25, and when the illuminance around the vehicle is 100%, the duty ratio of the digital micro-mirror may control the duty ratio to 99/1.

As described above, the DMD system according to the first embodiment of the present invention controls the duty ratio of the digital micro-mirror according to the illuminance around the vehicle sensed by the illuminance sensor 21, thereby preventing the lifespan of the digital micro-mirror from being reduced.

In this embodiment illustrated in FIG. 2, the illuminance sensor 21 is illustrated as being included in a separate vehicle system 20 rather than included in the DMD system 30, but there may be embodiments in which the DMD system 30 directly includes the illuminance sensor 21.

Second Embodiment

Figure 5:
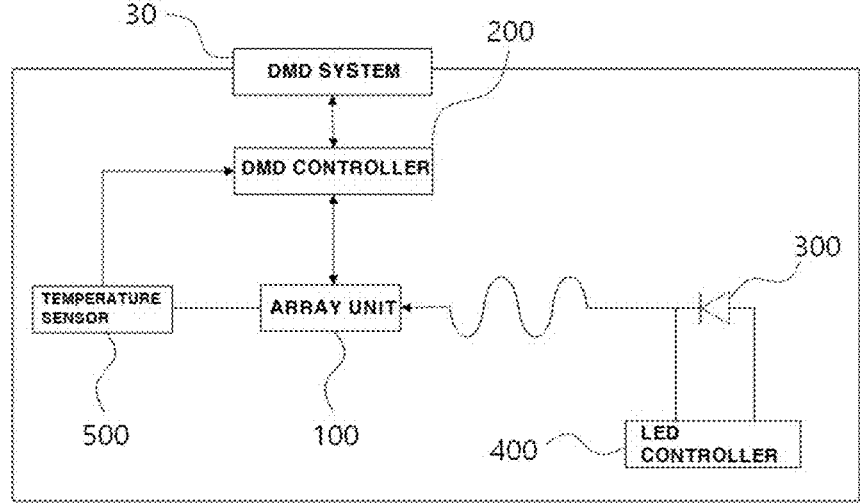
FIG. 5 is a block diagram of a DMD system according to a second embodiment of the present invention.

FIG. 5 is a block diagram of a DMD system according to a second embodiment of the present invention.

As illustrated in FIG. 5, a DMD system according to a second embodiment of the present invention further includes a temperature sensor 500 instead of the illuminance sensor 21 included in the DMD system according to the first embodiment of the present invention described above.

As illustrated in FIG. 5, the temperature sensor 500 is installed in the array unit 100 to sense the temperature of the digital micro-mirror included in the array unit 100, and the DMD controller 200 changes the duty ratio of the digital micro-mirror according to the temperature of the digital micro-mirror sensed by the temperature sensor 500. More specifically, the DMD controller 200 decreases the duty ratio of the digital micro-mirror when the temperature of the digital micro-mirror increases, and increases the duty ratio of the digital micro-mirror when the temperature of the digital micro-mirror decreases. This is because the lifespan of the digital micro-mirror itself is greatly affected by temperature. The present invention may further prevent the lifespan of the digital micro-mirror from being reduced by having the above-described embodiment.

Third Embodiment

Figure 6:
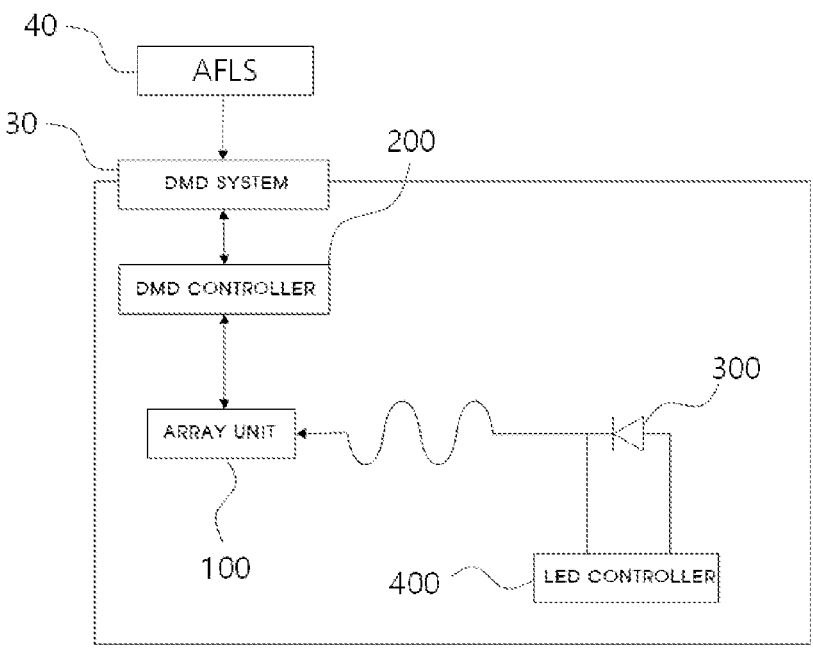
FIG. 6 is a block diagram of a DMD system according to a third embodiment of the present invention.

FIG. 6 is a block diagram of a DMD system according to a third embodiment of the present invention.

As illustrated in FIG. 6, a DMD system according to a third embodiment of the present invention further includes an adaptive front lighting system (AFLS) 40 instead of the illuminance sensor 21 included in the DMD system according to the first embodiment of the present invention described above.

The AFLS 40 is an intelligent device that differently controls headlights according to situations around the vehicle. The ALFS 40 may recognize current situations around a vehicle through various sensors or a position detection of the vehicle, and may operate headlights in various operation modes. In this embodiment, the AFLS 40 may operate headlights by distinguishing a highway driving mode, a national road driving mode, and a city driving mode. In relation to a method of distinguishing and operating, by an AFLS 40, a highway driving mode, a national road driving mode, a city driving mode, etc., the AFLS 40 monitors a vehicle speed, and determines that a vehicle is driving on a highway when the vehicle speed is high (for example, over 80 km/h) to operate headlights in the highway driving mode, and determines that a vehicle is driving on a national road or a city when the vehicle speed is a low speed (for example, 60 km or less) to operate headlights in the national road driving mode or the city driving mode. In addition to this, the AFLS 40 may determine an operation mode by receiving navigation information, that is, information on whether a current location of a vehicle is a highway, a national road, or a city, and determine the operation mode using an illuminance sensor. As the method of determining, by an AFLS 40, an operation mode, only any one of the above-described methods may be used, or at least two or more methods may be used in combination.

The DMD controller 200 receives information on the driving mode from the AFLS 40 and differently controls the duty ratio of the digital micro-mirror according to the received driving mode. More specifically, when the received driving mode is the highway driving mode, the DMD controller 200 determines that the current illuminance around a vehicle is high and controls the duty ratio of the digital micro-mirror to a first duty ratio. When the received driving mode is the national road driving mode, the DMD controller 200 determines that the current illuminance around a vehicle is low and controls the duty ratio of the digital micro-mirror to a second duty ratio. When the received driving mode is the city driving mode, the DMD controller 200 determines that the current illuminance around a vehicle is high and controls the duty ratio of the digital micro-mirror to a third duty ratio. Here, the first duty ratio and the third duty ratio may be higher than the second duty ratio.

In this embodiment, the DMD controller 200 receives information from a separate device included in the vehicle system 20, not a separate sensor, and controls the duty ratio of the digital micro-mirror based on the received information, so the DMD system itself is simplified.

Fourth Embodiment

A DMD system according to a fourth embodiment of the present invention includes a DMD controller 200, an array unit 100, an LED 300, and an LED controller 400. When the DMD controller 200 reduces a duty ratio of a digital micro-mirror, the LED controller 400 increases a current applied to the LED 300. This is because, when the duty ratio of the digital micro-mirror decreases, the luminance of the image output from the digital micro-mirror decreases, so the output of the LED 300 irradiating light with the digital micro-mirror increases to compensate for the luminance of the image output from the digital micro-mirror lastly, thereby controlling the luminance of the image to be within a certain range. That is, in this embodiment, this may be called the fixed quantity of light control of the DMD system.

However, as described above in this embodiment, when the output of the LED 300 increases, the temperature of the LED 300 increases, so there may be a problem in that the lifespan of the LED 300 decreases.

Figure 7:
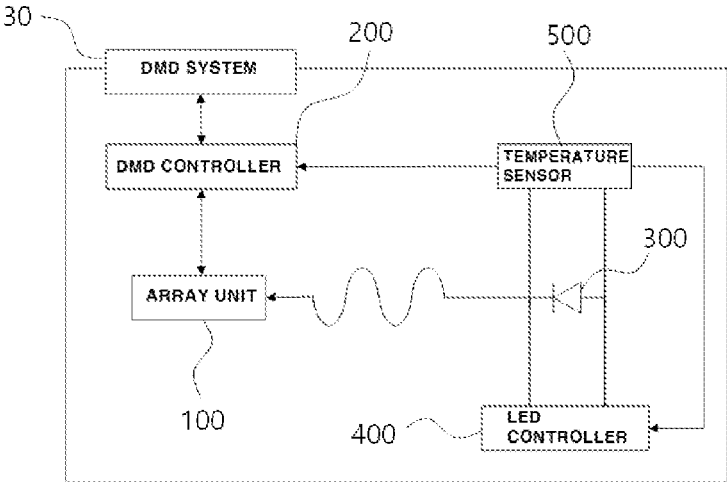
FIG. 7 is a block diagram of a DMD system according to a fourth embodiment of the present invention.

FIG. 7 is a block diagram of the DMD system according to the fourth embodiment of the present invention.

As illustrated in FIG. 7, the DMD system 30 according to the fourth embodiment of the present invention further includes a temperature sensor 500.

In this embodiment, the temperature sensor 500 senses the temperature of the LED 300, and the DMD controller 200 and the LED controller 400 differently control the digital micro-mirror and the LED 300, respectively, according to the temperature sensed by the temperature sensor 500.

Figure 8:
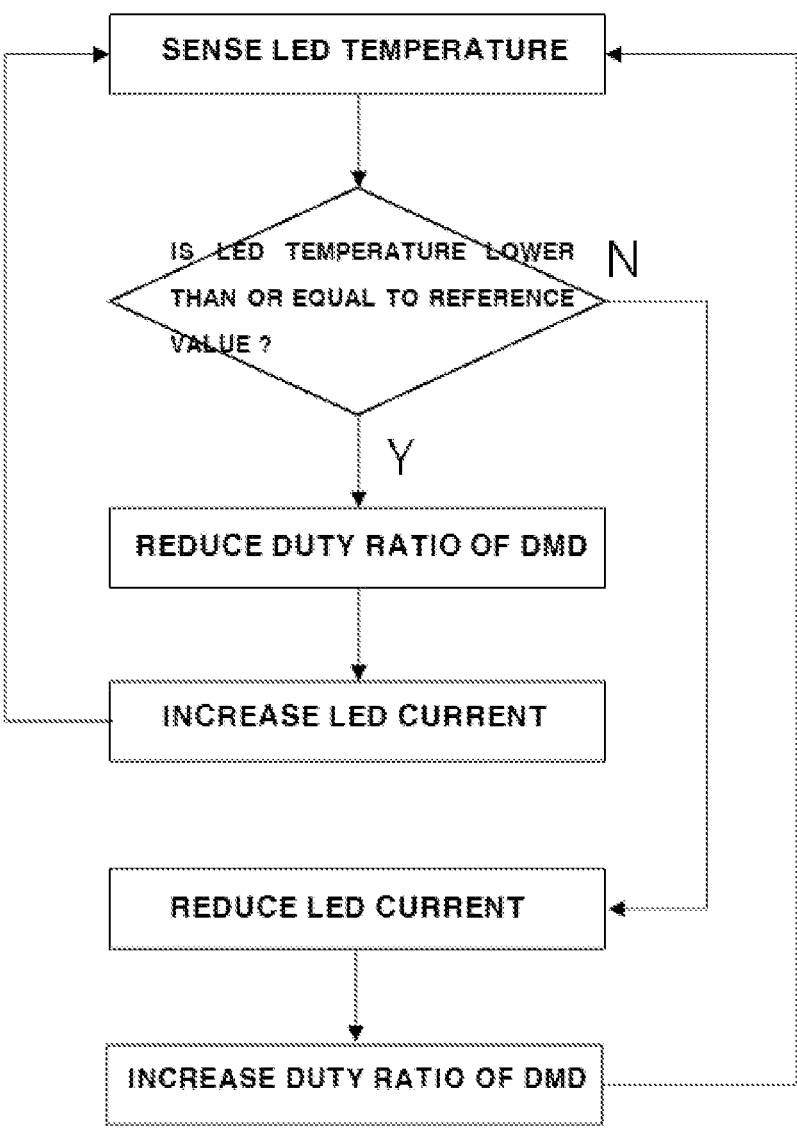
FIG. 8 is a diagram illustrating a sequence of controlling a digital micro-mirror and an LED 300 according to a temperature of the LED 300 sensed by a temperature sensor 500 in the DMD system according to the fourth embodiment of the present invention.

FIG. 8 is a diagram illustrating a sequence of controlling the digital micro-mirror and the LED 300 according to the temperature of the LED 300 sensed by the temperature sensor 500 in the DMD system according to the fourth embodiment of the present invention.

As illustrated in FIG. 8, when the temperature of the LED 300 sensed by the temperature sensor 500 is lower than or equal to a reference value, the DMD controller 200 reduces the duty ratio of the digital micro-mirror, and increases the output of the LED 300. When the output of the LED 300 increases, the temperature of the LED 300 itself may increase. Therefore, when the temperature of the LED 300 exceeds the reference value of the LED 300, the DMD controller 200 reduces the current applied to the LED 300 to decrease the output of the LED 300 and increase the duty ratio of the digital micro-mirror to perform the fixed quantity of light control of the DMD system 30.

Fifth Embodiment

Figure 9:
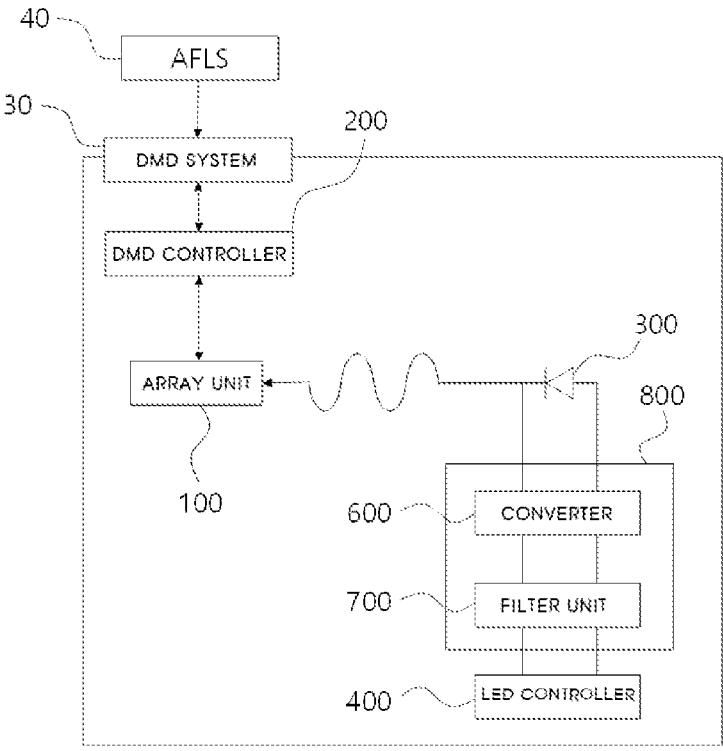
FIG. 9 is a block diagram of a DMD system according to a fifth embodiment of the present invention.

FIG. 9 is a block diagram of a DMD system according to a fifth embodiment of the present invention.

The DMD system according to the fifth embodiment of the present invention may further include a power board 800, including the components of the DMD system according to the fourth embodiment of the present invention described above. The power board 800 may include a filter unit 700 and a converter 600.

The power board 800 is disposed between the LED controller 400 and the LED 300.

The filter unit 700 may be implemented as an RC filter, and receives a control signal that is a PWM signal from the LED controller 400 and converts the received control signal into an analog signal.

The converter 600 receives the analog signal converted by the filter unit 700, and controls a magnitude of a current applied to the LED 300 according to a voltage level of the received analog signal. That is, in this embodiment, the LED 300 performs analog dimming control. In the DMD system 30 according to the present invention, the DMD controller 200, the LED controller 400, and the power board 800 are separated from each other, but are connected to each other with a cable. Therefore, these components are likely to malfunction due to the voltage drop and noise caused by the extended length of the cable, which is to be prevented.

Sixth Embodiment

In a DMD system according to a sixth embodiment of the present invention, a terminal may be used in addition to the DMD controller 200, the array unit 100, the LED 300, and the LED controller 400.

The terminal may be a display installed in a vehicle or an electronic device capable of communication used by a user, and the DMD controller 200 outputs a duty ratio setting menu to the terminal so that the user can change a duty ratio of a digital micro-mirror.

Figure 10:
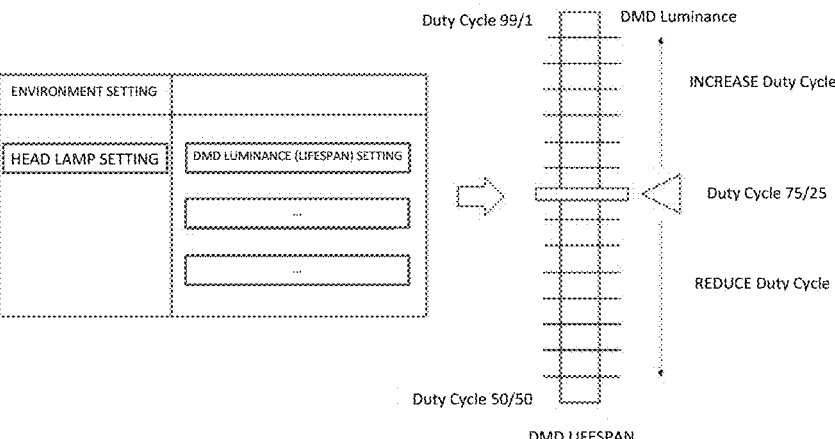
FIG. 10 is a diagram illustrating an example of a duty ratio setting menu output from a display unit in a DMD system according to a sixth embodiment of the present invention.

FIG. 10 is a diagram illustrating an example of a duty ratio setting menu output from a display unit in the DMD system according to the sixth embodiment of the present invention.

As illustrated in FIG. 10, when the user selects headlamp setting—DMD luminance (lifetime setting), the user may set whether to increase the luminance or the lifespan of the digital micro-mirror on a screen where the duty ratio of the digital micro-mirror may be adjusted, and the DMD controller 200 may change the duty ratio of the digital micro-mirror according to the duty ratio of the digital micro-mirror changed by the user. When the user selects a duty ratio command of the digital micro-mirror on the terminal, the terminal transmits the duty ratio command to the DMD controller 200, and the DMD controller 200 controls to change the duty ratio of the digital micro-mirror according to the received duty ratio command. Thereafter, the DMD controller 200 may output the control result to the terminal by changing the duty ratio.

As described above, according to a digital micro-mirror device (DMD) system of the present invention, by decreasing a duty ratio of the digital micro-mirror by a DMD controller according to the condition of components included in a vehicle or the environment around the vehicle, it is possible to increase the lifespan of a digital micro-mirror.

In addition, according to the present invention, even if luminance is lowered due to the reduced duty ratio of a digital micro-mirror, a light-emitting diode (LED) controller increases an output of an LED to control the quantity of light of an image output through the DMD system to be within a certain range.

In addition, according to the present invention, it is possible for a user to directly control a duty ratio of a digital micro-mirror through a display unit.

The present invention is not limited to the above-described embodiments, but may be variously applied, and may be variously modified without departing from the gist of the present invention claimed in the claims.

What is claimed is:

1. A digital micro-mirror device (DMD) system, comprising:
   an array unit that includes a plurality of digital micro-mirrors reflecting light; and
   a DMD controller that controls the digital micro-mirrors according to a predetermined image signal, and changes a duty ratio of the digital micro-mirrors according to a condition or an operation mode of components included in a vehicle or an environment around the vehicle,
   wherein the DMD controller differently controls the duty ratio of the digital micro-mirrors according to a driving mode of an adaptive front lighting system (AFLS) of the vehicle,
   wherein the driving mode of the vehicle's AFLS is at least one of a highway driving mode, a national driving mode, or a city driving mode,
   wherein the DMD controller controls the duty ratio of the digital micro-mirrors with a first duty ratio when the driving mode of the AFLS of the vehicle is a highway driving mode, when the driving mode of the AFLS of the vehicle is a national road driving mode, the duty ratio of the digital micro-mirrors is controlled with a second duty ratio, when the driving mode of the AFLS of the vehicle is a city driving mode, the duty ratio of the digital micro-mirrors is controlled with a third duty ratio, and the first duty ratio and the third duty ratio are greater than the second duty ratio.

2. The DMD system of claim 1, wherein the DMD controller reduces the duty ratio of the digital micro-mirrors when illuminance provided from an illuminance sensor sensing illuminance around the vehicle is lower than a predetermined reference.

3. The DMD system of claim 1, further comprising:

a temperature sensor that senses a temperature of the digital micro-mirrors, wherein the DMD controller reduces the duty ratio of the digital micro-mirrors when the temperature sensed by the temperature sensor is higher than a predetermined reference.

4. The DMD system of claim 1, further comprising:

a light-emitting diode (LED) that irradiates light to the array unit; and an LED controller that drives the LED, wherein, when the DMD controller reduces the duty ratio of the digital micro-mirrors, the LED controller increases a current applied to the LED to increase an output of the LED.

5. The DMD system of claim 4, further comprising:

a filter unit that receives a control signal, which is a pulse width modulation (PWM) signal, from the LED controller and converts the received control signal into an analog signal; and a converter that receives the analog signal converted by the filter unit and controls a magnitude of current flowing through the LED according to a voltage level of the received analog signal.

6. The DMD system of claim 1, further comprising:

a light-emitting diode (LED) that irradiates light to the array unit;

an LED controller that drives the LED; and a temperature sensor that senses a temperature of the LED, wherein, when the temperature of the LED sensed by the temperature sensor increases, the LED controller reduces a current input to the LED to reduce an output of the LED, and the DMD controller increases the duty ratio of the digital micro-mirrors.

7. The DMD system of claim 6, further comprising:

a filter unit that receives a control signal, which is a pulse width modulation (PWM) signal, from the LED controller and converts the received control signal into an analog signal; and a converter that receives the analog signal converted by the filter unit and controls a magnitude of current flowing through the LED according to a voltage level of the received analog signal.

8. The DMD system of claim 1, wherein the DMD controller receives a duty ratio command of the digital micro-mirrors received from a terminal, and changes the duty ratio of the digital micro-mirrors according to the received duty ratio command of the digital micro-mirrors.

9. The DMD system of claim 8, wherein the DMD controller outputs the changed duty ratio of the digital micro-mirrors to the terminal.

* * * * *